Dec. 14, 1948.                H. S. OGDEN                2,456,427
            PROTECTIVE SYSTEM FOR ELECTRIC MOTORS
                      Filed Nov. 28, 1944
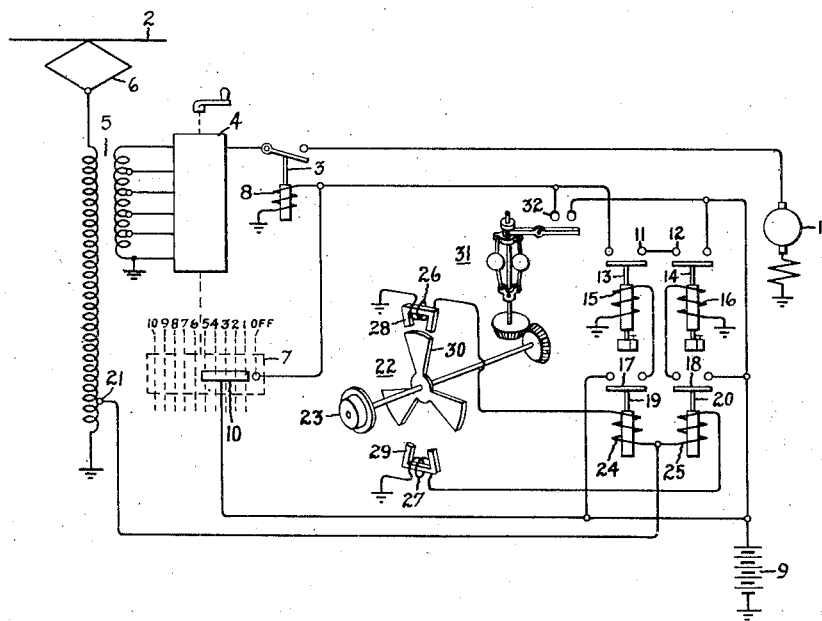
Inventor:
Harold S. Ogden,
by *Harry E. Dunham*
    His Attorney.

Patented Dec. 14, 1948

2,456,427

UNITED STATES PATENT OFFICE 2,456,427

PROTECTIVE SYSTEM FOR ELECTRIC MOTORS

Harold S. Ogden, Erie, Pa., assignor to General Electric Company, a corporation of New York Application November 28, 1944, Serial No. 565,553

9 Claims. (Cl. 318—397)

My invention relates to control systems, and more particularly to speed responsive control apparatus and systems for electric vehicles of the alternating current traction motor type. The invention is especially suitable for preventing overload due to stalling or low speed operation of alternating current traction motors.

Alternating current traction motors of the series field type are commonly used for traction purposes because of their high starting torque and favorable accelerating characteristics. It is generally recognized, however, that such motors are unable to exert high torque at standstill or at very low speeds for any period of time appreciably in excess of the normal starting period. This limitation arises from the fact that the high alternating current voltage induced in the short-circuited armature coils by transformer action produces sparking at the brushes and excessive heating of the commutator bars. Such excessive heating very quickly takes the temper out of the commutating bars, thereby inducing wear and flat spots on the commutator and poor commutation even at normal running speeds.

Accordingly, it is a general object of my invention to provide means for preventing stalling or undesirably low speed operation of an alternating current traction motor.

It is a more particular object of my invention to prevent stalling or low speed operation of an alternating current traction motor for periods appreciably longer than the normal accelerating interval.

It is still another object of my invention to provide means for preventing stalling or low speed operation of an alternating current traction motor except during the normal accelerating sequence under the control of an accelerating controller.

It is a more specific object of my invention to provide new and novel means responsive to the speed of a controlled element for maintaining a desired condition of operation at all speeds in excess of a predetermined minimum speed.

My invention itself will be more fully understood by referring now to the following detailed specification taken in conjunction with the accompanying drawing, the single figure of which is a schematic circuit diagram of an electric vehicle traction motor control system embodying my invention.

Referring now to the drawing, I have shown a traction motor control system for an electric vehicle comprising an electric traction motor 1 of the series field type arranged for connection to a power conductor 2 through a line contactor 3, an accelerating controller 4, a power transformer 5, and a pantograph 6. The power transformer 5 is of the variable voltage type, and has a plurality of secondary winding taps connected to the accelerating controller 4 to provide voltage control for starting the traction motor 1. For this purpose the accelerating controller 4 provides a plurality of starting positions, shown as positions 1—10 in connection with a contact drum 7 forming a part of the controller 4. It will be understood that the voltage applied to the motor 1 is gradually increased as the controller is moved from position 1 to position 10.

The line contactor 3 is provided with an actuating winding 8 connected for energization from a suitable source of control power, such as a battery 9, through either of three parallel energizing circuits. The first of these circuits, and that through which the normal accelerating operation of the motor 1 is carried out, extends from the positive terminal of the battery 9, through a contact segment 10 on the controller drum 7, and through the line contactor actuating winding 8 to ground. The controller segment 10 is of such length that this circuit through the line contactor actuating winding 8 is closed only when the controller 4 is in certain of its low speed positions. For example, the controller segment 10 is shown as extending over only the first five positions of the controller 4, so that the line contactor energizing circuit through the controller is interrupted when the controller is in position 6 or any of its higher speed running positions.

In order to maintain the line contactor 3 closed in normal acceleration of the vehicle after the controller 4 has been moved to one of its high speed positions beyond the extent of the contact segment 10, the line contactor actuating winding 8 is connected to the positive terminal of the battery 9 through a second energizing circuit. This second circuit includes the normally open series connected contacts 11 and 12 of a pair of relays 13 and 14, respectively, of the time delay drop-out type. The time delay relays 13 and 14 are provided with actuating windings 15 and 16, respectively, which are arranged for connection to the positive terminal of the battery 9 through the normally open contacts 17 and 18 of a pair of control relays 19 and 20, respectively.

The control relays 19 and 20 are connected for alternate energization from a low voltage tap 21 on the power transformer 5 under the control of a speed responsive device 22 connected to an idler wheel 23 of the propelled vehicle. For this purpose, actuating windings 24 and 25 of the control relays 19 and 20, respectively, are connected between the transformer tap 21 and ground through a pair of variable inductances 26 and 27, respectively. The inductances 26 and 27 are provided with iron cores 28 and 29, respectively, positioned for cooperation with a segmented iron rotor 30 connected to the idler wheel 23 for rotation at a speed proportional to the speed of the vehicle. The cores 28 and 29 are so positioned with respect to the rotor 30 that when the magnetic circuit of one inductance is completed through a rotor segment the magnetic circuit of the other includes a large air gap. For example, as shown in the drawing, a rotor having an odd number of iron segments is provided for cooperation with an even number of iron core inductances. Thus, with the rotor in the position shown, the inductance of the variable inductance 26 is so large, by reason of the completion of its magnetic circuit through the rotor 30, that the relay 19 remains dropped out, while the inductance of the variable inductance 27 is relatively small, thereby permitting the flow of a sufficiently large magnetizing current through the actuating winding 25 to pick up the relay 20 upon application of power to the alternating current power conductor 2.

By reason of the response of the control relays 19 and 20 to differences in magnetizing current, as described above, the relays 19 and 20 are alternately energized, as the rotor 30 rotates, at a repetition rate proportional to the speed of the vehicle, thereby alternately to energize the time delay relays 13 and 14 at the same repetition rate. It will be evident that, if the speed of the vehicle is sufficiently great, for example, 3 to 5 miles per hour, so that the time interval between successive energizations of any one of the time delay relays 13 and 14 is less than the time required for delayed drop-out of that relay, both relays 13 and 14 will remain picked up, thereby continuously to maintain a circuit from the positive terminal of the battery 9 through the actuating winding 8 of the line contactor 3, despite the fact that the controller 4 has opened the initial energizing circuit through the contact segment 10. It will be understood, of course, that the contact segment 10 on the controller 4 maintains the circuit of the line contactor closed until such a controller position is reached that the vehicle speed in an accelerating operation at normal load is greater than the speed required to maintain the time delay relays 13 and 14 continuously picked up.

In order to protect against failure of the time delay relays 13 and 14 at high vehicle speeds, I preferably provide also an additional speed responsive means, such as a centrifugal device 31 having a pair of normally open contacts 32 connected in shunt circuit relation with the contacts 11 and 12 of the time delay relays 13 and 14. The centrifugal device 31 is connected to the idler wheel 23 and is set to close the contacts 32 at a vehicle speed appreciably in excess of the minimum vehicle speed necessary to maintain the time delay relays 13 and 14 continuously picked up. Under the conditions heretofore given by way of example, the device 31 may suitably be set to close the contacts 32 at about 15 miles per hour. In operation, the vehicle is set in motion by turning the controller 4 from its "off" to its first position, thereby to complete a circuit through the contact segment 10 for the line breaker actuating winding 8. When the line breaker 3 picks up, it connects the motor 1 to the variable voltage power transformer 5 and accelerating operation takes place in a normal manner as the controller 4 is moved through its positions 1 to 10, inclusive. During such accelerating operation the line contactor circuit through the controller segment 10 is interrupted when the controller reaches its position 6. However, if the vehicle is being accelerated under normal load conditions, the vehicle speed at controller segment 6 will be sufficiently great that the time delay relays 13 and 14 are both maintained continuously picked up by alternate energization under control of the speed responsive device 22. It will be evident that this condition obtains when the reciprocal of the repetition rate of successive energizations of any one of the time delay relays is substantially equal to or less than the time delay in drop-out of that relay. The repetition rate of successive energization of the relays 13 and 14 is, of course, determined by the speed of the vehicle as described above. Thus, when the line contactor circuit through the contact segment 10 is interrupted in normal operation, a parallel circuit through the relay contacts 11 and 12 is already closed, so that the line contactor does not drop out. If, however, the vehicle stalls down to a low speed or comes substantially to standstill with the controller 4 in any of its high speed positions 6 to 10, inclusive, a predetermined minimum speed will be reached below which successive energizations of the relays 13 and 14 do not occur sufficiently frequently to maintain these relays both continuously picked up. In the event that any one of the relays 13 or 14 drops out, the line contactor actuating circuit is interrupted and the line contactor drops out.

From the foregoing description it will now be evident that I have provided a new and novel standstill prevential apparatus or the like which requires very little maintenance and which is rugged and reliable in operation. These characteristics result in most part from the fact that those parts of the system which must be mounted beneath a vehicle, and particularly the speed responsive device 22, are simple in form and carry no sensitive relays, contactors or the like. In my system all the time delay and auxiliary relays and the like may be mounted upon a control panel within the vehicle where they may be protected against dirt, vibration and weather.

While I have described only a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. An electric vehicle control system comprising an electric traction motor, switching means for connecting said motor to a source of electric current supply for starting said motor, means responsive to the speed of said vehicle and operable below a predetermined minimum speed to disable said switching means, means for accelerating said motor during starting operation, and means controlled by said accelerating means for rendering said speed responsive means ineffective during starting operation.

2. An electric vehicle control system comprising an alternating current traction motor, switching means for connecting said motor to a source of alternating current supply for starting said motor, means responsive to the speed of said vehicle for energizing said switching means at speeds above a predetermined speed and deenergizing said switching means at speeds below said predetermined speed, means for accelerating said motor, and means controlled by said accelerating means for energizing said switching means independently of said speed responsive means at speeds below said predetermined speed during normal accelerating operation.

3. An electric vehicle control system comprising an alternating current traction motor, switching means for connecting said motor to a source of alternating current supply, first means responsive to the speed of said vehicle for deenergizing said switching means at speeds below a predetermined minimum vehicle speed, means for accelerating said motor, means controlled by said accelerating means for energizing said switching means independently of said speed responsive means at speeds below said minimum speed during normal accelerating operation, and additional means responsive to the speed of said vehicle for positively energizing said switching means independently of said first speed responsive means at all speeds above a predetermined speed greater than said minimum speed.

4. An electric traction motor control system comprising an alternating current traction motor, switching means for connecting said motor to a source of alternating current supply, means operable in response to the speed of said vehicle for rendering said switching means operable to connect said motor to said supply source at speeds above a predetermined minimum speed, an accelerating controller, and means controlled by said accelerating controller for rendering said switching means operable to connect said motor to said supply source at speeds below said predetermined minimum speed in normal accelerating operation.

5. An electric vehicle control system comprising driving means for said vehicle, a plurality of relays having predetermined time periods of operation and having their contacts connected in series circuit relation jointly to control said driving means, and means operable in accordance with the speed of said vehicle successively to energize said relays thereby to maintain all said relays in predetermined circuit controlling positions whenever the speed of said vehicle is such that successive energization of each relay takes place at intervals less than the time periods of such relays.

6. An electric vehicle control system comprising an alternating current traction motor, switching means for connecting said motor to a source of alternating current supply, means for energizing said switching means comprising a pair of time delay relays having normally open contacts connected in series circuit relation, means for alternately energizing said relays at a repetition rate proportional to the speed of said vehicle thereby to maintain both said contacts closed at speeds above a predetermined minimum speed, and manually operable means for accelerating said motor including means for energizing said switching means independently of said relays at speeds below said minimum speed in normal starting operation.

7. An electric vehicle control system comprising an alternating current traction motor, switching means for connecting said motor to a source of alternating current supply, means for energizing said switching means comprising a relay of the time delay drop-out type, means for recurrently energizing said relay at a repetition rate proportional to the speed of said vehicle thereby continuously to maintain said relay picked up at speeds above a predetermined minimum speed, and manually operable means for accelerating said motor including means for energizing said switching means independently of said relay at speeds below said minimum speed in normal starting operation.

8. An electric vehicle control system comprising an alternating current traction motor, switching means for connecting said motor to a source of alternating current supply, means for energizing said switching means comprising a pair of relays having their contacts normally open and connected in series circuit relation, said relays having a predetermined time delay in drop-out operation, variable impedance means operable in accordance with the speed of said vehicle alternately to energize said relays thereby to maintain contacts of both said relays continuously closed above a predetermined minimum speed, a multi-position accelerating controller for said motor, means operable by said controller throughout a low speed range thereof to render said relays ineffective to deenergize said switching means, the upper limit of said low speed range providing a vehicle speed normally in excess of said predetermined minimum speed, and additional means responsive to the speed of said vehicle for rendering said relays ineffective above a second predetermined speed greater than said minimum speed.

9. A control system for an electrically driven vehicle having a driving axle comprising driving means for said vehicle, a plurality of time delay relays mounted upon said vehicle and having their contacts connected in series circuit relation jointly to control said driving means, and inductive means mounted beneath said vehicle and operable in accordance with the speed of said axle alternately and recurrently to energize said relays, thereby to maintain all said relays in predetermined circuit controlling positions whenever the speed of said vehicle is such that recurrent energization of each relay takes place at intervals less than the time periods of such relays.

HAROLD S. OGDEN.

REFERENCES CITED

The following references are of record in the file of this patent:

UNITED STATES PATENTS

| Number | Name | Date |
| --- | --- | --- |
| 1,047,557 | Owens | Dec. 17, 1912 |
| 1,249,526 | Shelton | Dec. 11, 1917 |
| 1,279,360 | Korthals | Sept. 17, 1918 |
| 1,898,921 | Watson | Feb. 21, 1933 |
| 1,912,924 | Utne | June 6, 1933 |
| 2,130,453 | Bone | Sept. 20, 1938 |
| 2,140,390 | Lunge | Dec. 13, 1938 |
| 2,232,751 | Wilson | Feb. 25, 1941 |
| 2,250,141 | Thurston | July 22, 1941 |
| 2,255,092 | Wintsch | Sept. 9, 1941 |
| 2,265,203 | Six | Dec. 9, 1941 |
| 2,333,210 | Stern | Nov. 2, 1943 |